Dec. 8, 1931. E. N. JACOBI 1,835,305
LOCKING DEVICE
Filed Feb. 28, 1930 3 Sheets-Sheet 2
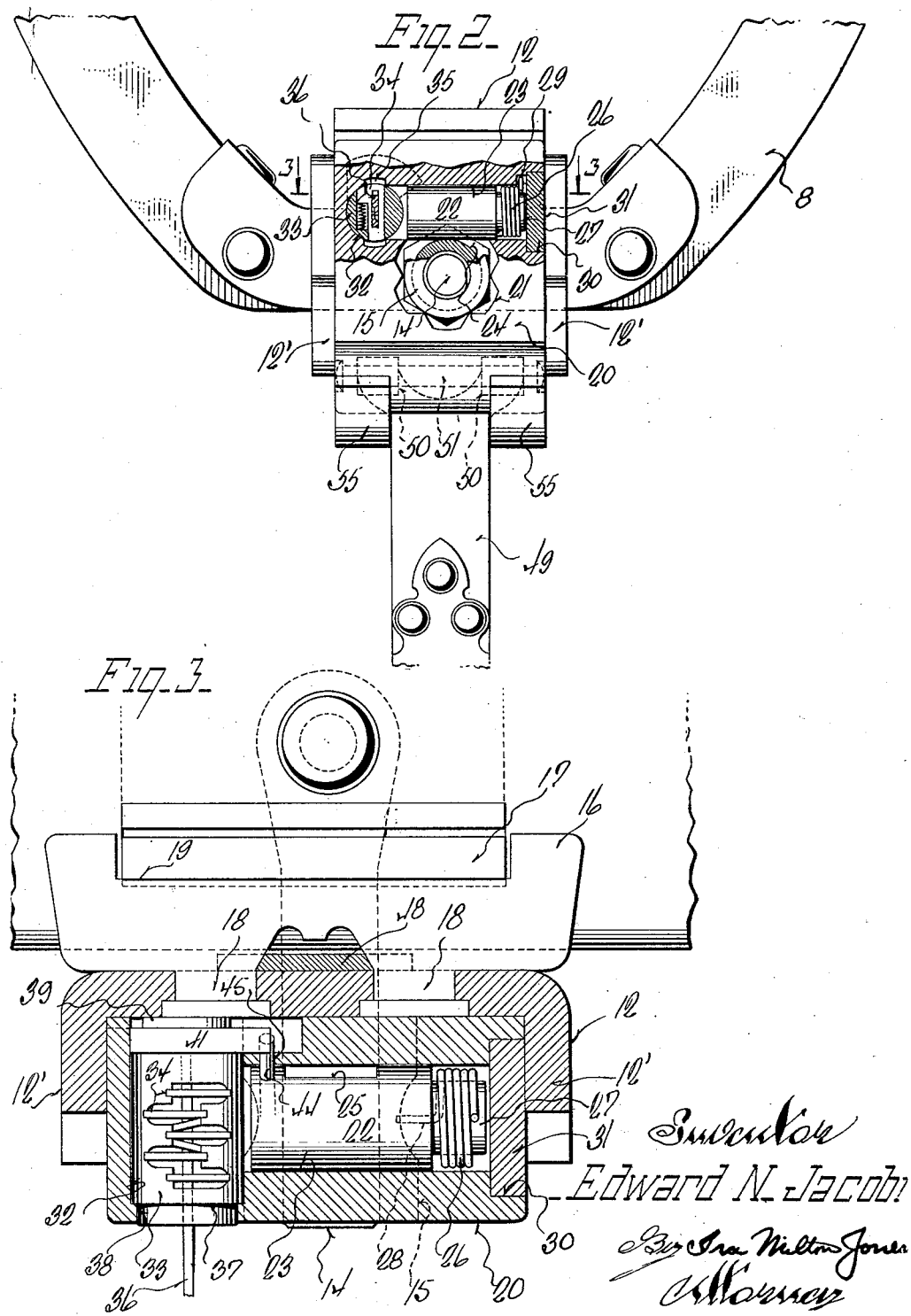

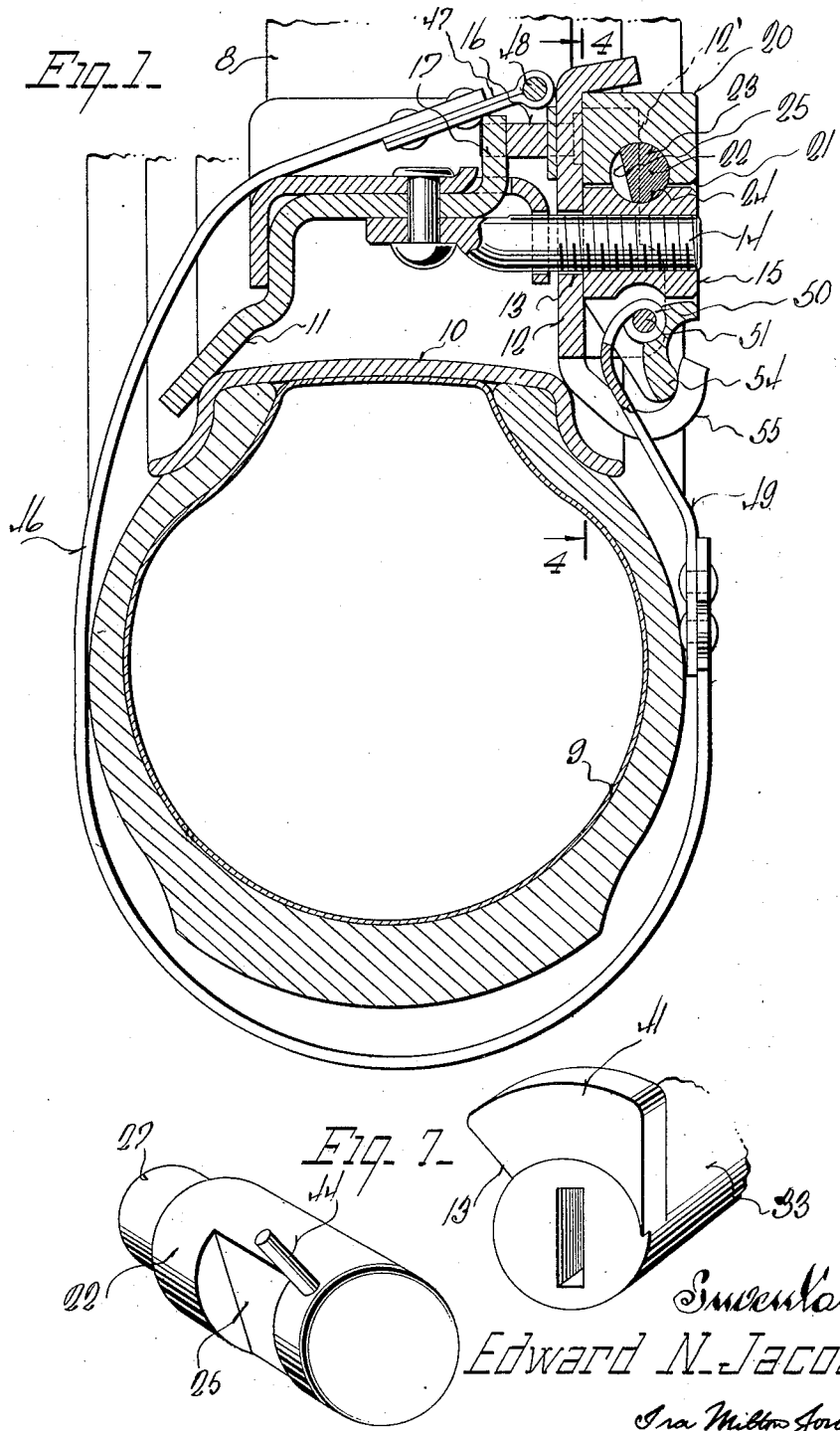

Dec. 8, 1931.  E. N. JACOBI  1,835,305
LOCKING DEVICE
Filed Feb. 28, 1930  3 Sheets-Sheet 3
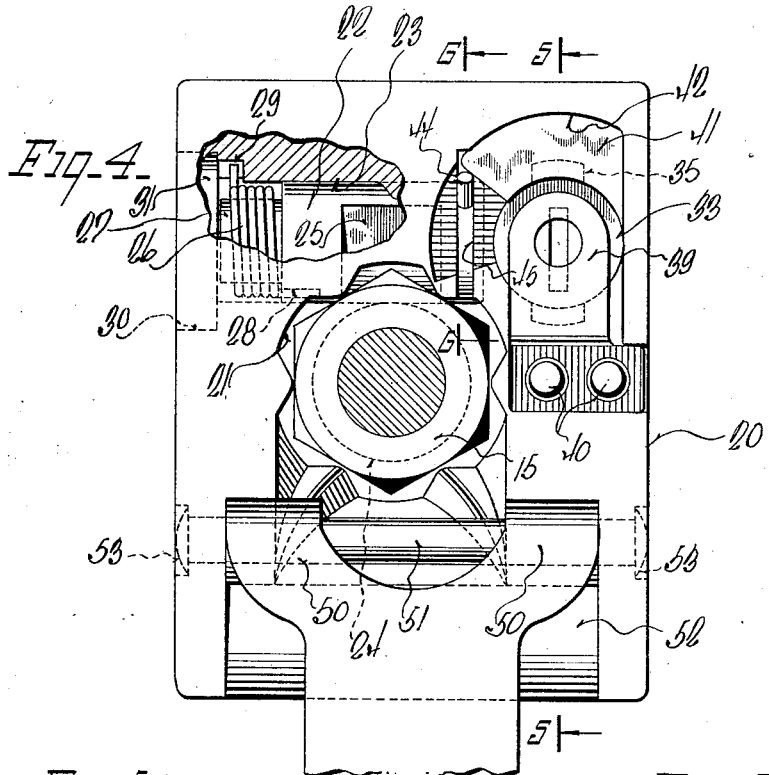
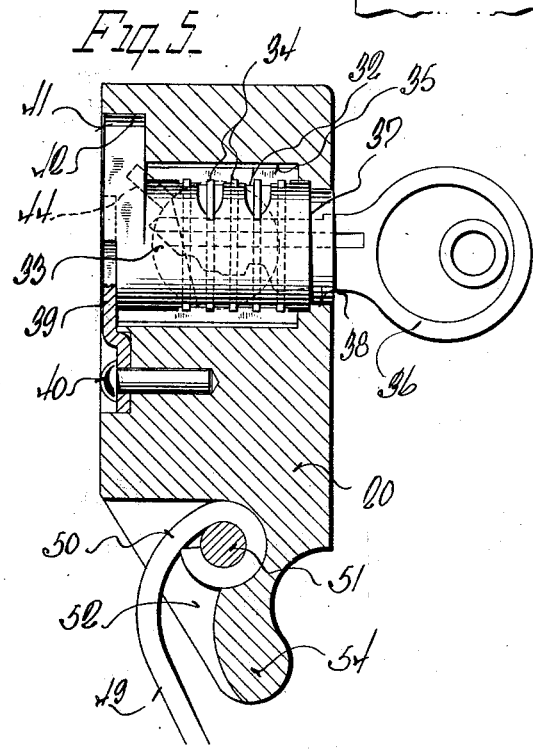
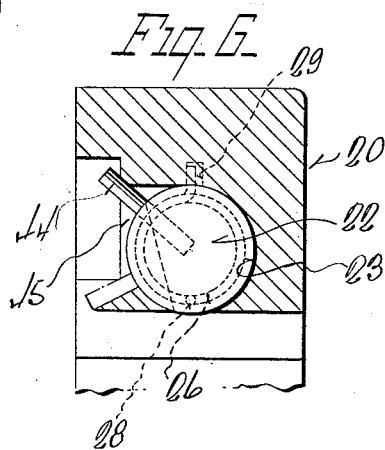
Inventor
Edward N. Jacobi.
By Ira Milton Jones Patented Dec. 8, 1931

1,835,305

UNITED STATES PATENT OFFICE

EDWARD N. JACOBI, OF MILWAUKEE, WISCONSIN, ASSIGNOR TO BRIGGS & STRATTON CORPORATION, OF MILWAUKEE, WISCONSIN, A CORPORATION OF DELAWARE

LOCKING DEVICE

Application filed February 28, 1930. Serial No. 432,128.

This invention relates to certain new and useful improvements in locking devices and refers more particularly to means for locking spare tires to their carriers.

It is an object of this invention to provide novel means for totally surrounding the clamping nut of a tire carrier to prevent the engagement of a tool therewith.

Another object of this invention resides in the provision of an enclosure engageable over a clamping nut for securing the same against turning and key controlled lock means for releasably securing the same in operative position.

Another object of this invention resides in the provision of a member releasably securable over a clamping nut and having a general polygonal shaped aperture engageable with the nut to simultaneously secure the nut against turning and prevent the engagement of a tool therewith.

A further object of this invention resides in the provision of a tire locking device of the character described in which means are provided for locking the clamping nut against retrograde movement and in which the clamping nut locking means also serves to lock a steel band or the like around the tire and its carrier.

With the above and other objects in view which will appear as the description proceeds, my invention resides in the novel construction combination and arrangement of parts substantially as hereinafter described and more particularly defined by the appended claims, it being understood that such changes in the precise embodiment of the herein disclosed invention may be made as come within the scope of the claims.

In the accompanying drawings, I have illustrated one complete example of the physical embodiment of my invention constructed according to the best mode I have so far devised for the practical application of the principles thereof, and in which:

Figure 1 is a cross sectional view taken through a conventional tire carrier and tire mounted thereon illustrating my improved locking device applied thereto;

Figure 2 is a front elevational view of the carrier and the locking mechanism with portions broken away and in section;

Figure 3 is an enlarged, detail cross sectional view taken through Figure 2 on the plane of the line 3—3;

Figure 4 is an enlarged detail sectional view taken through Figure 1 on the plane of the line 4—4;

Figure 5 is a detail sectional view taken through Figure 4 on the plane of the line 5—5;

Figure 6 is a fragmentary sectional view taken through Figure 4 on the plane of the line 6—6, and Figure 7 is a perspective view of the locking bolt and the inner end of the lock cylinder illustrating the means whereby rotation of the lock cylinder is imparted to the bolt.

Referring now more particularly to the accompanying drawings in which like numerals designate like parts throughout the several views, the numeral 8 represents a portion of a conventional spare tire carrier upon which a tire 9 is adapted to be mounted in the usual manner with the lower portion of its rim 10 engaging an abutment 11 directed downwardly from the bracket at the inner side thereof, and against which the tire rim is adapted to be secured by a rim clamp 12.

The rim clamp 12 has an aperture 13 through which a threaded stud 14 secured at its inner end to the bracket in any suitable manner extends, and onto which a nut 15 is threaded to draw the rim clamp inwardly toward the adjacent periphery of the tire rim.

To provide a fulcrum for the rim clamp and to maintain the same as nearly as possible in a plane at right angles to the axis of the stud when in operative position, the upper end of the clamp has a heel or projection 16 secured thereto which engages against an upwardly directed stop 17 carried by the bracket.

As best illustrated in Figure 3, the heel 16 is secured to the rim clamp 12 by spaced lugs 18 projected from its inner edge and which are secured in suitable apertures formed in the clamp. The outer edge of the heel which engages the stop 17 has its central portion cut away, as at 19, to receive the stop and to thus secure the clamp against turning about the axis of the stud.

With the nut 15 drawn down to secure the clamp in operative position, retrograde movement of the nut and a consequent loosening of the rim clamp is prevented by engaging the body 20 of a novel locking element over the nut in a manner to be later described, the opposite side marginal edges of the clamp being directed laterally, as at 12′, to form spaced walls between which the body member 20 is received.

The lock body 20 may be constructed from a solid block of metal, but is preferably a die casting having a substantially centrally located transverse opening 21 of irregular shape to receive the nut 15 and to, when engaged thereover, secure the same against rotation, the particular shape of the opening being such that a relatively small clearance between the lock body and the nut permits a relatively large variation in the angular position of the flat sides of the nut. It is also noted that the thickness of the lock body is substantially equal to that of the nut so that when the body is in position over the nut it is impossible to apply a wrench or other tool to the nut.

A key controlled lock mechanism having cooperating elements carried by the lock body and the nut secures the lock body against removal from its operative position engaged over the nut. The cooperating elements carried by the lock body and the nut are a locking bolt 22 which is rotatably mounted, in a bore 23 extending transversely into the lock body at right angles to the irregularly shaped opening 21 and directly thereabove, and an annular groove 24 encircling the medial portion of the nut. The bottom of the annular groove 24 is arcuately shaped in cross section and is struck on a radius substantially equal to that of the bolt 22 so that when the lock body is in its operative position engaged over the nut, the bolt in locking position has a portion thereof received in the annular channel 24 to restrain the lock body and the nut against relative movement.

As best illustrated in Figure 7, the central portion of the lock bolt which is directly above the nut has one side cut away, as at 25, to, when the bolt is turned to a position at which the flat side of the cut-away portion 25 is parallel with the axis of the stud, permit the lock body to be moved axially with respect to the nut. Normally, the lock bolt is yieldably maintained in a position at which the flat bottom of the cut-away portion 25 is disposed at an angle to the axis of the stud so that the solid cylindrical wall of the bolt is received in the channel 24 of the nut by a tortion spring 26.

The spring 26 is coiled about a reduced end 27 of the lock bolt to be received in the transverse bore 23 in which the bolt is rotatably mounted, and one end thereof is projected into an aperture 28 drilled into the shoulder at the base of the reduced end 27, and its other end is received in a notch 29 communicating with the bore 23, at its extreme outer end. It is noted that the angular position of the recess bottom 25 when the bolt is in normal position is such that the lock body may be engaged over the nut by merely forcing the same thereover and causing the forward face of the nut to twist the bolt against the action of its spring which returns the bolt to its operative normal position when the lock body reaches its fully operative position.

The outer end of the bore 23 in which the locking bolt is mounted is counterbored, as at 30, to receive a plug or circular plate 31 which closes the bore and prevents movement of the spring 26 from its proper position, the plug preferably having a drive fit in the counterbore. The opposite or inner end of the bore 23 communicates with a bore 32 whose axis intersects and is at right angles to the axis of the bore 23 and parallel to the axis of the irregular opening 21.

Mounted in the bore 32 is a lock cylinder 33 of conventional construction having a plurality of locking tumblers 34 spring urged to engage their outer ends in locking grooves 35 communicating with the bore 32 to prevent rotation of the cylinder. Upon the insertion of a proper key 36, the tumblers 34 are retracted within the periphery of the cylinder in the usual manner to free the same for rotation which is imparted to the locking bolt in a manner to be later described, to release the lock body from the nut.

Outward longitudinal movement of the lock cylinder is prevented by a shoulder 37 at the base of its reduced outer end which engages a shoulder between the bore 32 and a bore 38 of smaller diameter. At the inner end of the lock cylinder a retaining plate 39 holds the cylinder against inward longitudinal movement, the plate 39, as best illustrated in Figures 4 and 5, being secured to the lock body by a pair of pins 40 having a drive fit in suitable apertures formed in the lock body.

To transmit rotation from the lock cylinder to the locking bolt the inner end of the cylinder is provided with a laterally projected segmental cam 41 which is received in a suitable recess 42 formed in the inner face of the lock body. The leading edge 43 of the cam engages the outer end of a pin 44 secured in the adjacent portion of the locking bolt so that rotation of the lock cylinder forces the pin 44 downwardly to turn the bolt and align its cut-away portion 25 with the axis of the irregularly shaped opening 21 to thus permit the movement of the lock body out of operative position.

The pin 44 projects through a slot 45 which communicates the bottom of the recess 42 with the bore 23, and as the width of the slot 45 is substantially equal to the diameter of the pin 44, the locking bolt is held against longitudinal movement in its bore by the engagement of the pin in its slot. It is, of course, understood that the pin 44 is assembled with the bolt after its insertion in the bore 23.

To further insure against the theft of the tire, a steel band or strap 46 encircles the tire and the carrier and is locked in position by the securement of the lock body over the nut. One end of the strap 46 has a hinge fitting 47 riveted or otherwise secured thereto with which a member 48 engages to hingedly connect the strap with the rim clamp. The member 48 is secured to the clamp by having portions of its opposite sides cut away to provide notches in which the lugs 18 of the heel 16 are received so that the securement of the heel to the clamp also serves to maintain the member 48 rigidly connected therewith.

The opposite end of the strap has a member 49 riveted or otherwise secured thereto whose outermost end has bifurcated arms 50 which are curled over a pin 51. The arms 50 are received in a depression 52 formed in the rear wall of the lock body and the ends of the pin 51 pass through aligned apertures in the sides of the depression 52, and are riveted over in suitable counterbores 53.

The lower portion of the lock body has a toe or extension 54 which is engageable behind a pair of spaced hooks 55 extended from the rim clamp and spaced apart a distance sufficient to receive therebetween the strap carried member 49. In this manner the toe 54 forms a fulcrum about which the lock body may be rocked in its movement to and from operative position, and to permit such swinging movement the lower rear wall of the irregularly shaped opening 21 is cut away and merges into the depression 52, as best illustrated in Figure 4.

From the foregoing description taken in connection with the accompanying drawings, it will be readily apparent to those skilled in the art to which an invention of the character described appertains, that I have provided a novel and efficient means for securely locking a spare tire to its supporting bracket in which a single member secures the usual clamping nut against rotation and completely encloses the same to prevent the engagement of a tool therewith.

What I claim as my invention is:

1. In a device of the character described, a nut, a member having a polygonal opening therein corresponding in shape to said nut, and engageable over the nut and having projections contacting the nut at spaced points about the periphery thereto to prevent the engagement of a tool therewith, and means releasably locking said second member in operative position.

2. In a device of the character described, a clamping member having a portion with which a tool is engageable to release the clamping member, an apertured member having an opening corresponding in shape to said clamping member and having projections adapted to receive the said portion of the clamping member to prevent engagement of a tool therewith, and means for readily releasably locking said apertured member against removal from its position receiving the clamping member.

In testimony whereof I have hereunto affixed my signature.

EDWARD N. JACOBI.